US012591128B2

(12) United States Patent
Shahpurwala

(10) Patent No.: US 12,591,128 B2
(45) Date of Patent: Mar. 31, 2026

(54) MAGNIFYING LAMP WITH CAMERA

(71) Applicant: Aven International Incorporated, Ann Arbor, MI (US)

(72) Inventor: Mohamedi Taher Shahpurwala, Ann Arbor, MI (US)

(73) Assignee: Aven International Incorporated, Ann Arbor, MI (US)

( * ) Notice: Subject to any disclaimer, the term of this patent is extended or adjusted under 35 U.S.C. 154(b) by 374 days.

(21) Appl. No.: 18/279,137

(22) PCT Filed: Aug. 8, 2022

(86) PCT No.: PCT/US2022/039679
§ 371 (c)(1),
(2) Date: Aug. 28, 2023

(87) PCT Pub. No.: WO2023/022893
PCT Pub. Date: Feb. 23, 2023

(65) Prior Publication Data
US 2024/0302645 A1     Sep. 12, 2024

Related U.S. Application Data

(60) Provisional application No. 63/234,775, filed on Aug. 19, 2021.

(51) Int. Cl.
*G02B 25/02*      (2006.01)
*G02B 25/00*      (2006.01)
*H04N 23/57*      (2023.01)

(52) U.S. Cl.
CPC ........... *G02B 25/02* (2013.01); *G02B 25/007* (2013.01); *H04N 23/57* (2023.01)

(58) Field of Classification Search
CPC ..... G02B 25/02; G02B 25/007; G02B 27/025
See application file for complete search history.

(56) References Cited

U.S. PATENT DOCUMENTS 7,518,791 B2     4/2009  Sander
8,002,432 B2 *   8/2011  Chen ................... G02B 25/005
                                                            362/183

(Continued)

FOREIGN PATENT DOCUMENTS

CN      109031648    *  7/2018  ............. G02B 25/02
EP      1481278         8/2008
JP      2000035545      2/2000

OTHER PUBLICATIONS

Vision Engineering, BenchKam for Bench Magnifiers, 2 pages, downloaded from https://www.visioneng.com on Aug. 12, 2021.

(Continued)

*Primary Examiner* — Joseph P Martinez
(74) *Attorney, Agent, or Firm* — Warner Norcross + Judd LLP

(57)          ABSTRACT

A magnifying lamp with a camera, and a system comprising the magnifying lamp are provided. The magnifying lamp includes a lamp head including a magnifying lens, a light source, and the camera, and an arm supporting the lamp head. The camera is capable of capturing a still image or a video. The magnifying lamp further includes a port or other connection for communicating with an external device to send image data from the camera to the external device.

14 Claims, 5 Drawing Sheets

(56)                References Cited

U.S. PATENT DOCUMENTS

2012/0170274 A1      7/2012   Lu
2016/0212350 A1*    7/2016   Rousseau ............. G02B 25/007

OTHER PUBLICATIONS

Vision Engineering Ltd. "Bibliographic information for BenchKam
Product Showcase", Sep. 17, 2020, https://www.youtube.com/watch?
v=Pxt7C-w7ra4, retrieved on Nov. 11, 2022.

\* cited by examiner

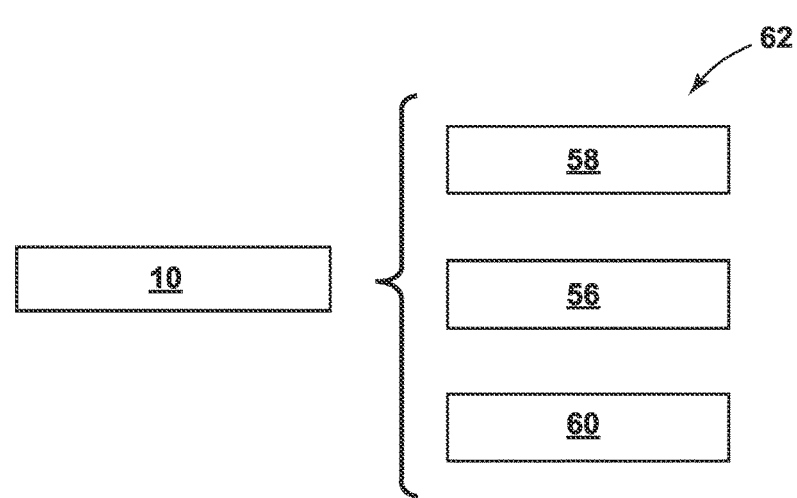
FIG. 5
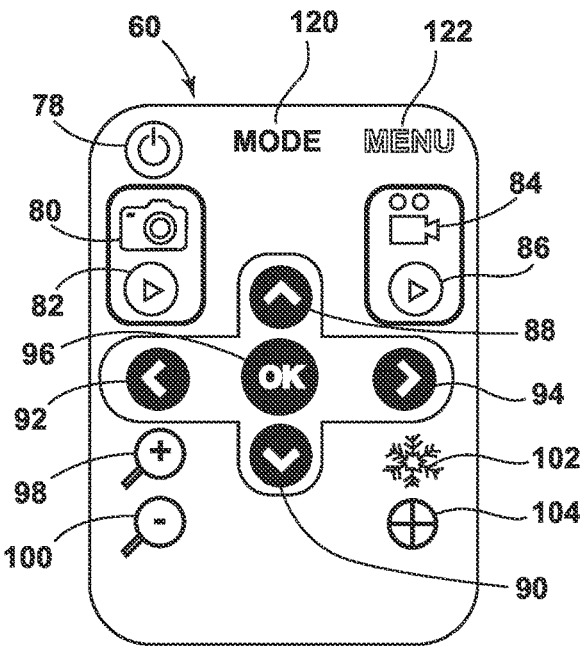
FIG. 6             FIG. 7

MAGNIFYING LAMP WITH CAMERA

CROSS-REFERENCE TO RELATED APPLICATION(S)

This application is the U.S. National Stage of International Application No. PCT/US2022/039679, filed on Aug. 8, 2022, which claims the benefit of U.S. Provisional Patent Application No. 63/234,775, filed Aug. 19, 2021, both of which are incorporated herein by reference in their entirety.

FIELD OF THE INVENTION

This disclosure provides for a magnifying lamp comprising a camera.

BACKGROUND OF THE INVENTION

Magnifying lamps or magnifiers, are common tools providing inspection lighting. A number of magnifying lamps have been developed for use in laboratory, medical, health and beauty, at-home, and other applications. Such magnifying lamps commonly include a magnifying lens and a bright light source.

With previous magnifying lamps, the user is often unable to easily capture and share images of an object being inspected. Various efforts have been made to incorporate cameras into magnifying lamps, but these suffer from several drawbacks and limitations.

There remains an opportunity to provide improved magnifying lamps. There also remains an opportunity to provide improved image capture and image sharing for magnifying lamps.

BRIEF SUMMARY OF THE INVENTION

Disclosed is a magnifying lamp incorporating a camera.

In a first general embodiment, the magnifying lamp includes a lamp head including a magnifying lens, a light source, and a camera, and an arm supporting the lamp head.

In one embodiment, the camera is a disposed on the lamp head, below the magnifying lens.

In an embodiment related to the one immediately above, the camera is coupled with the housing by a moveable joint such that the camera can be rotated about at least one axis to adjust the angle of the camera independently of the lamp head.

In an embodiment related to the one immediately above, the camera is a digital camera capable of capturing a still image or a video.

In an embodiment related to the one immediately above, the light source comprises a plurality of light-emitting diodes (LEDs) on the lamp head.

In another embodiment, the magnifying lamp may communicate with external devices, such as a display device, a storage device, a remote control, or other external devices.

In addition, a system comprising according to any one of the above embodiments is also disclosed. The system images the magnifying lamp, a display device, and a remote control.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and practiced or carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

Other advantages of the disclosure will be readily appreciated, as the same becomes better understood by reference to the following detailed description when considered in connection with the accompanying drawings wherein:

FIG. 5 is a schematic view of a system including the magnifying lamp from FIG. 1;

FIG. 6 is a user interface for the camera of the magnifying lamp from FIG. 1;

FIG. 7 is a top view of a remote control for a magnifying lamp according to yet another aspect of the invention;

DETAILED DESCRIPTION OF THE INVENTION

Figure 1:
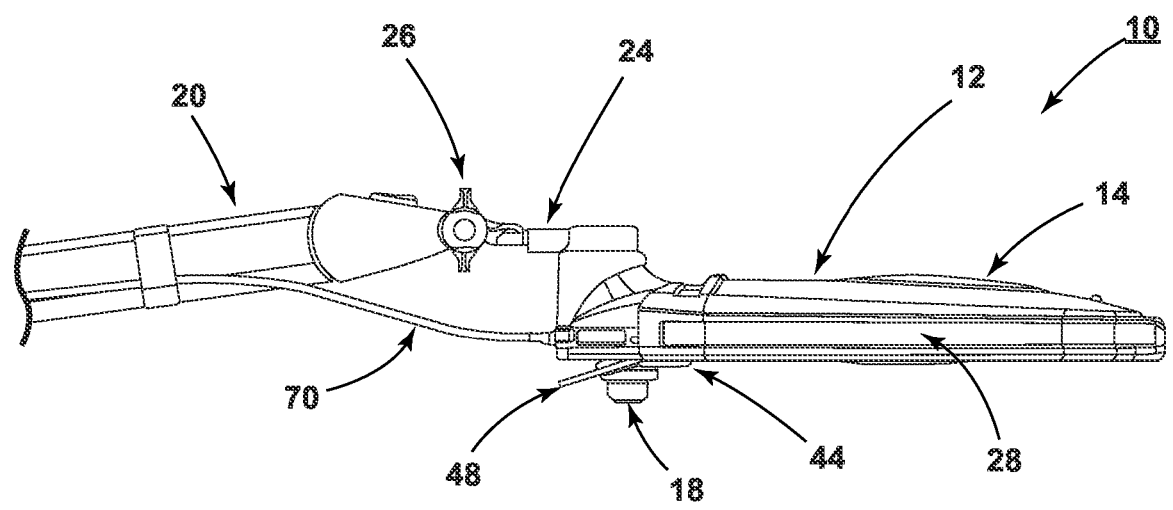
FIG. 1 is a side view a magnifying lamp having a camera according to a one aspect of the invention.

A magnifying lamp having a camera is disclosed. The magnifying lamp includes local and/or remote control for the camera functions.

FIGS. 1-4 show a magnifying lamp 10 according to a one aspect of the invention. The magnifying lamp 10 includes a lamp head 12 including a magnifying lens 14, a light source 16, and a camera 18, and an arm 20 supporting the lamp head 12. The magnifying lamp 10 can house a power source, such as a battery, or may be coupled to an exterior power source via a power cord.

The lamp head 12 can be coupled with the arm 20 by a swivel joint or universal joint 24, such that the lamp head 12 can be positioned at various angles. An adjustable tension knob 26 can be adjusted to increase or decrease the force needed to swivel the lamp head 12.

The lamp head 12 includes a housing 28 supporting the magnifying lens 14, light source 16, and camera 18. The lamp head housing 28 can include a handle 30 that can be gripped to adjust the position of the lamp head 12.

The magnifying lens 14 is a convex lens, preferably glass for high-quality, distortion free viewing. In other embodiments, a plastic lens may be used. Regardless of material, the magnifying lens 14 can provide a magnification of 2× or more, 2.25× or more, 3× or more, 4× or more, or 4.75× or more, with a power of 5, 8, 12, or 15 diopters, and more generally in a range of 2-15 diopters.

The magnifying lamp 10 can comprise a single, fixed lens 14, or can accommodate multiple, interchangeable lenses. Having multiple lenses may greatly expand the magnification range of the lamp 10. In embodiments where multiple lenses are provided, the lenses may be designed for easy lens exchange without the use of tools.

The arm 20 can be a spring-balanced arm with multiple joints which can be set or locked in various desired positions. The arm 20 can be an enclosed arm, e.g. with no partially or fully exposed springs. In other embodiments, the arm 20 can be a flexible gooseneck arm which can be adjusted to position the lamp head 12 at various angles. In yet other embodiments, the arm 20 can be a stand which is not adjustable.

The magnifying lamp 10 can include a mounting clamp (not shown) for attaching the lamp 10 to a desk, table, bench top, or other surface. In other embodiments, the magnifying lamp 10 can include a weighted base (not shown) adapted to rest on a surface and support the lamp 10 in a stable manner. In other embodiments, the magnifying lamp 10 can include a wheeled floor stand (not shown).

The light source 16 can include at least one light emitting element, such as one or more light-emitting diodes (LEDs), configured to emit light in the visible spectrum (e.g., about 400-700 nm). In some embodiments, the light source 16 can include at least one additional light emitting element configured to emit light outside the visible spectrum, such as in the ultraviolet spectrum (e.g., about 10-400 nm). In one embodiment, the light source 16 can include a plurality of white LEDs and a plurality of UV LEDs. Other suitable light emitting elements for the light source 16 include, but are not limited to, incandescent bulbs, fluorescent bulbs, and fiber optics.

The light emitting elements can be disposed at various locations on the lamp head 12, and provided in various numbers and arrangements. In the embodiment shown, the LEDs are disposed on a bottom side of the housing 28, at an outer periphery of the magnifying lens 14, with a first plurality of LEDs 32 arranged on a first side 34 of the lens 14 and a second plurality of LEDs 36 on arranged second side 38 of the lens 14. The camera 18 can be disposed between the first and second plurality of LEDs 32, 36, with the LEDs 32, 36 extending forwardly of the camera 18. In other embodiments, the LEDs 32, 36 can be arranged in a ring around the magnifying lens 14.

The lamp head 12 has a power button 40 to turn the light source 16 on and off. Other controls for the light source 16 may be provided on the magnifying lamp 10, such as on the lamp head 12, or remote from the magnifying lamp 10, and may include one or more of a brightness intensity adjustment, a color temperature adjustment, and/or a light type selector (e.g. visible light vs. UV light). In one non-limiting example, the magnifying lamp 10 has a maximum brightness of 1100 lm and an adjustable color temperature of 3500K-6500K.

A camera 18 in accordance with the present invention comprises an image capture device configured to capture an image. The image may include corresponding image data. By way of example, the camera 18 may include a digital camera configured to capture a still image or a video. The digital camera may include a 2D camera, a 3D camera, a panoramic camera, a web camera, or the like, or any combination thereof. The digital camera may include an optical sensor, a radio detector, an artificial retina, a mirror, a telescope, a microscope, or the like, or any combination thereof. For example, the digital camera may include a manual-focus camera, an autofocus camera, a telephoto camera, a wide angle camera, a single lens reflex (SLR) camera, a digital single lens reflex (DSLR) camera, or the like, or any combination thereof.

In some embodiments, the camera 18 may capture and/or collect image data based on electromagnetic waves with various wavelengths and/or frequencies. In some embodiments, the electromagnet waves may include visible light, ultraviolet radiation, or the like, or any combination thereof.

The camera 18 is integrated with the lamp head 12. The camera 18 can be disposed at various locations on the lamp head 12. In the embodiment shown, the camera 18 is disposed on a bottom, rear side 42 of the housing 28, at an outer periphery of the magnifying lens 14 so that it is not obtrusive for normal magnified viewing through the lens 14. The camera 18 preferably depends below the magnifying lens 14 for a clear field of view.

The camera 18 can be fixed or adjustable on the lamp head 12. In the embodiment shown, the camera 18 is coupled with the housing 28 by a pivot joint 44 such that the camera 18 can be rotated about an axis 46 defined the pivot joint 44 to adjust the angle of the camera 18. The camera 18 can include a handle 48 that can be gripped to adjust the position of the camera 18. In other embodiments, the camera 18 can be coupled with the housing 28 by a swivel joint such that the camera 18 can be rotated about multiple axes. In either case, the camera 18 can be adjusted independently of the lamp head 12.

The magnifying lamp 10 can include an indicator light 50 showing a status of the camera 18. The indicator light 50 can be disposed on the lamp head 12 in various locations, and preferably may be on a top side 52 of the housing 28 so that a user can view the indicator light 50 during normal operation of the magnifying lamp 10. The indicator light 50 can be configured to emit visible light in different colors, such as, but not limited to, red, blue, green, orange, yellow, and the like, to convey information to the user.

In one embodiment, the indicator light 50 can emit visible light in a first color, such as green, when the camera 18 is powered on and during normal operation of the camera 18. To convey an event such as a change in status or an error condition, the indicator light 50 can change the color of the emitted visible light. For example, the indicator light 50 can emit visible light in a second color, such as red, when the camera 18 is in a standby or power-saving mode. As another example, the indicator light 50 can emit visible light in a third color, such as orange, when the camera 18 has established a communication link with an external device, such as a PC. In this regard, upon seeing the color change, a user understands that a status of the camera 18 has changed.

Image data from the camera 18 can be stored on a removable media, and the magnifying lamp 10 can have a media port 54 into which the removable media may be inserted. In one embodiment, the media port 54 may be a secure digital (SD) card port and the removable media may be an SD card, but other types of removable media may be utilized as well. As used herein, the term "SD card" includes SD, mini SD, micro SD, SDHC, SDXS, SDUC, and other types of SD cards. Other suitable media ports include those for SM cards, CF cards, xD cards, memory sticks, USB sticks, and microdrives. The media port 54 can be disposed at various locations on the lamp head 12. In the embodiment shown, the media port 54 is disposed on a rear peripheral side of the housing 28, to one side of the arm 20.

Referring to FIG. 5, in some embodiments, the magnifying lamp 10 may communicate with external devices, such as a display device 56, a storage device 58, a remote control 60, or other external devices. Image data processed and/or generated by the camera 18 may be transmitted to the external devices 56, 58, 60. The magnifying lamp 10 and other external devices can form a system 62. In some embodiments, one or more of the external devices, for example the display device 56 and the storage device 58, may be integrated as a single device.

The display device 56 may be configured to display information. In some embodiments, display device 56 may include a liquid crystal display (LCD), a light emitting diode (LED) based display, a flat or curved panel display, a cathode ray tube (CRT), a 3D display, a plasma display panel, a touch screen, a remote controller, or the like, or any combination thereof. In some embodiments, the information displayed on display device 56 may include an image from the camera 18, a menu, a user interface, control information, a program, software, an algorithm, or the like, or any combination thereof.

The storage device 58 may be configured to store information that may be accessible to other components of the system, including the camera 18 and/or display device 56. The information may include data, programs, software, algorithms, text, number, or the like, or any combination thereof. The information may be obtained from the camera 18, the display device 56, or other modules or units, or any combination thereof. In some embodiments, storage device 58 may be a hard disk drive, a solid-state drive, a removable storage drive. Merely by way of example, the removable storage drive may include a flash memory disk drive, a hard drive, a tape, a CD-ROM, cloud storage, an optical disk drive, or the like, or any combination thereof.

The remote control 60 may be a user device for operating the camera 18, and may be a computing device, laptop, smartphone, tablet, computer, smart speaker, or I/O devices. I/O devices may be present in the computing device. In some embodiments, the remote control 60 may be integrated with the display device 56 and/or storage device 58 as a single device. In other embodiments, the remote control 60 is separate from other external devices connected to the magnifying lamp 10. One non-limiting embodiment of a remote control 60 is shown in FIG. 7 and is described in further detail below. In addition to controlling the camera 18, in some embodiments the remote control 60 can operate other features of the magnifying lamp 10, such as the light source 16.

Figure 3:
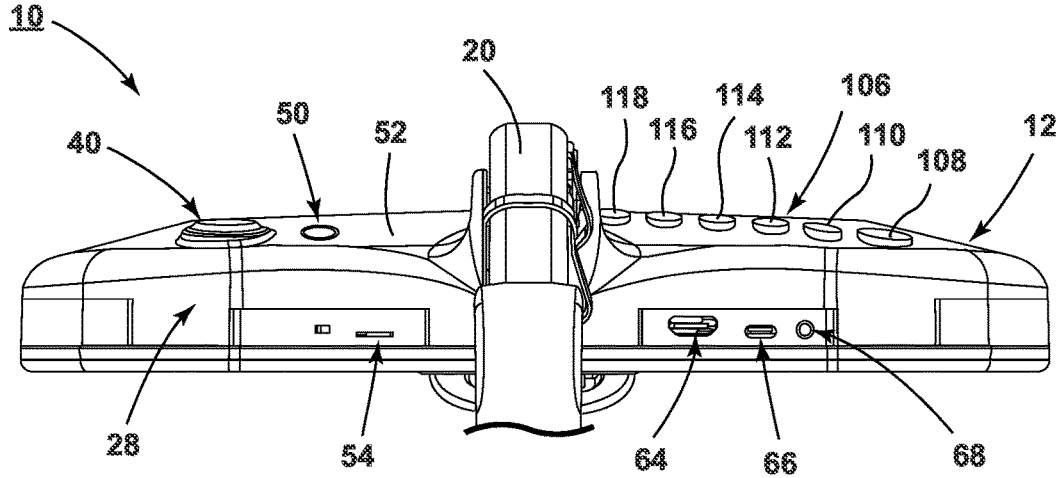
FIG. 3 is a rear view of the magnifying lamp from FIG. 1.
Figure 4:
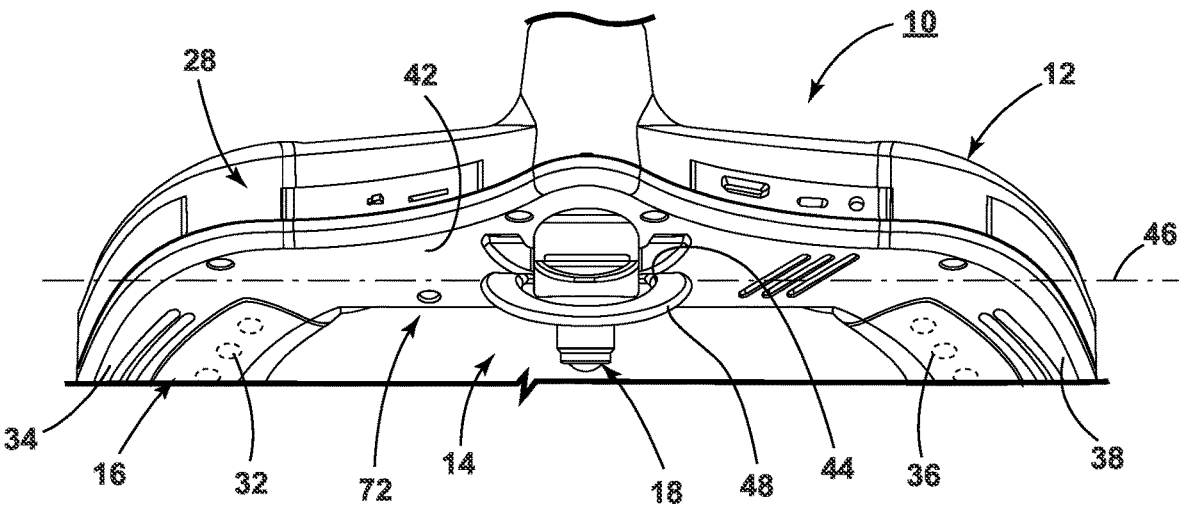
FIG. 4 is a bottom perspective view of the magnifying lamp from FIG. 1.
Figure 8:
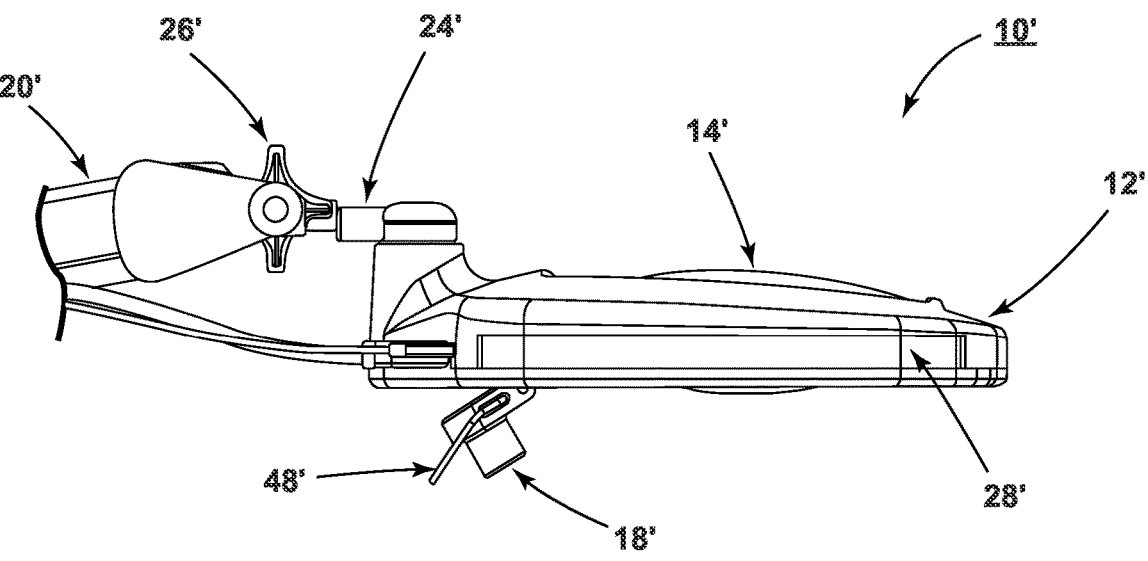
FIG. 8 is a side view a magnifying lamp according to another aspect of the invention.
Figure 9:
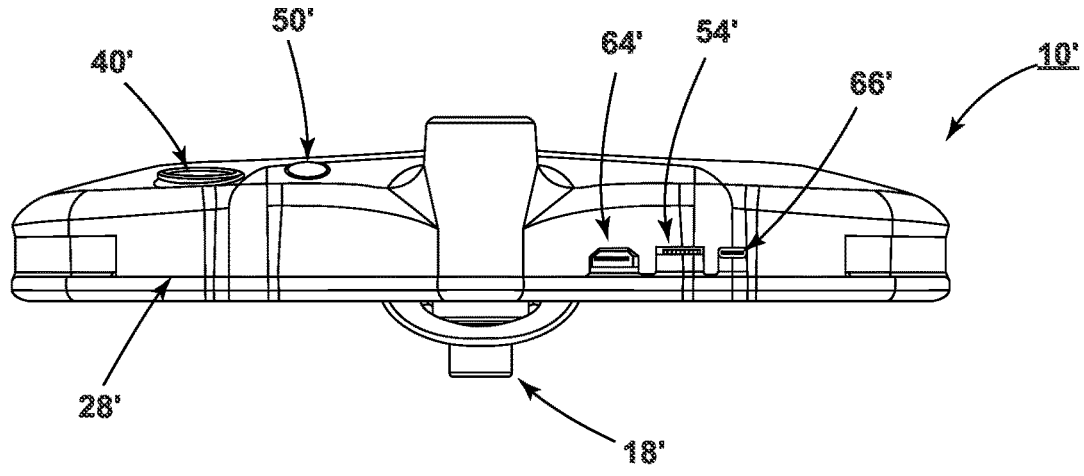
FIG. 9 is a rear view of the magnifying lamp from FIG. 8.
Figure 10:
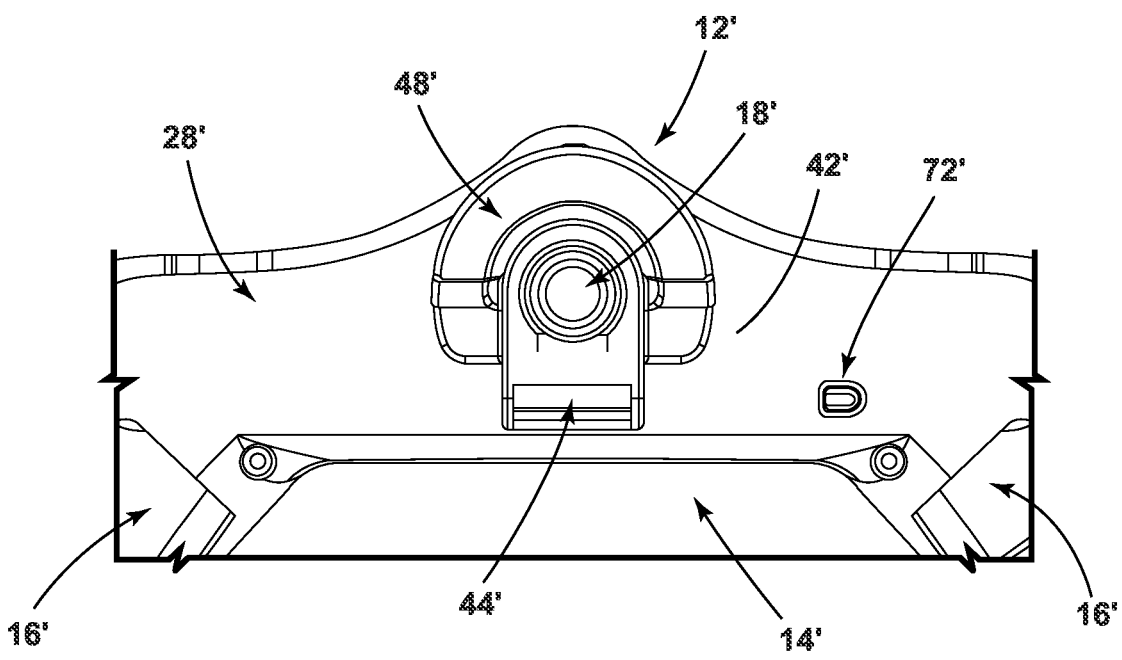
FIG. 10 is a bottom view of the magnifying lamp from FIG. 8.

Referring to FIGS. 3 and 4, the magnifying lamp 10 can include one or more I/O ports to which external or peripheral devices may be connected. Via the I/O port, an external or peripheral device can be connected to the magnifying lamp 10, including to the camera 18 and/or to the light source 16. In one non-limiting example, the magnifying lamp 10 has an external display port 64, a data port 66, and a remote control port 68. The ports 64, 66, 68 can be disposed at various locations on the lamp head 12. In the embodiment shown, the ports 64, 66, 68 are disposed on a rear peripheral side of the housing 28, on the other side of the arm 20 as the media port 54.

Figure 2:
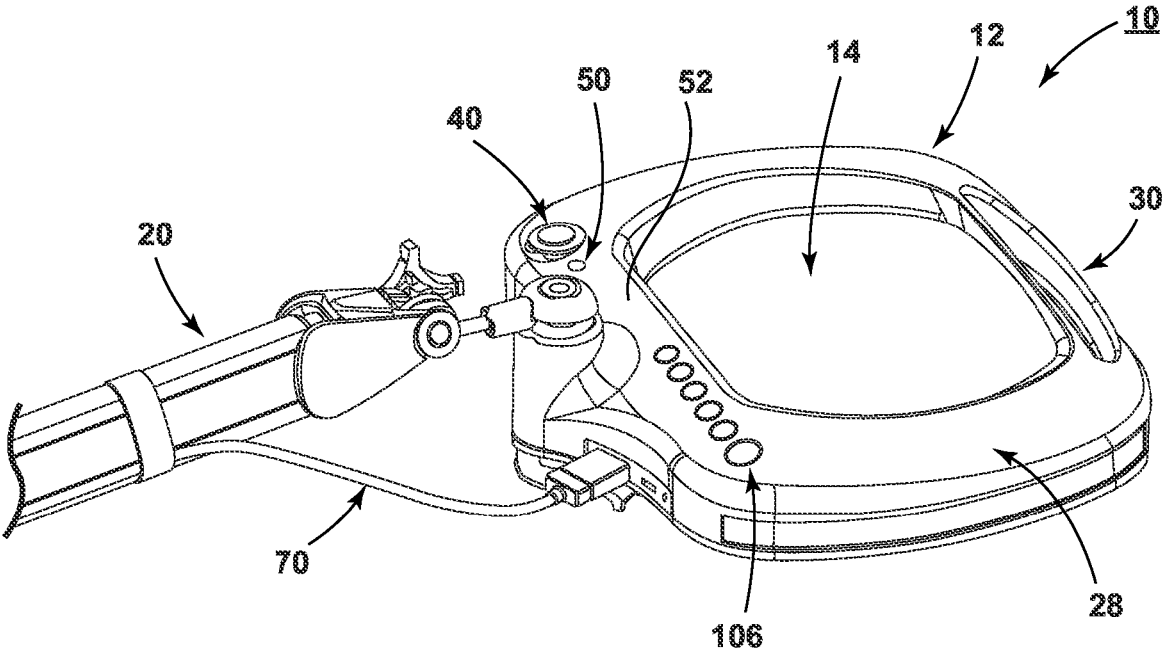
FIG. 2 is a top perspective view of the magnifying lamp from FIG. 1.

The external display port 64 (e.g., a high-definition multimedia interface (HDMI) port) can facilitate connection of the external display device 56 to the camera 18. For example, the display device 56 may show image data, including a still image or video. As another example, the display device 56 may be used as a real-time media display device so the user may watch a live feed captured the camera 18. The display device 56 may additionally have an on screen display (OSD) menu for making adjustments to the displayed camera image, including, but not limited to, brightness, contrast, resolution, color (RGB) settings, white balance, and the like, or any combination thereof. Other suitable display ports include mini-VGA, VGA, DVI-D, DVI-I, mini- and micro-DVI, mini- and micro-HDMI, DisplayPort, mini-DisplayPort, USB Type-C, and Thunderbolt™. Referring to FIG. 1-2, the external display device 56 can be tethered to the magnifying lamp 10 by a cable 70 via the external display port 64.

The data port 66, for example a universal serial bus (USB) (e.g., USB-C port), can be used to transfer data between the camera 18 and an external device. For example, the external storage device 58 can be connected to the data port 66 to transfer image data to the storage device 58. As an example of a data transfer, image data may be transferred through the data port 66 to a computer, smartphone, or a mass storage device. As another example, software updates for the camera 18 may be transferred through the data port 66. As yet another example, the data port 66 can be used to transfer image information from the camera 18 to the display device 56. As understood in the art, certain data ports, e.g. USB-C ports, can also transmit both data and power.

The remote control port 68 (e.g., a phone jack) can facilitate connection of the external remote control 60 to the camera 18. For example, the remote control 60 can be tethered to the magnifying lamp 10 by a cable (not shown). In other embodiments, the remote control port 68 is not provided, and the remote control 60 communicates wirelessly with the lamp 10. One non-limiting embodiment of a wireless remote control 60 is shown in FIG. 7 and described in further detail below.

Other examples of I/O ports for the magnifying lamp 10 include one or more of a Firewire port, a Thunderbolt™ port, a DisplayPort port, a digital visual interface (DVI) port, a video graphics array (VGA) port, an audio out for audio interfaces, and a network port (e.g., an Ethernet jack or other network connection) to facilitate connection of the magnifying lamp 10 to a communications network such the Internet. In another example, one of the I/O ports may be used to transfer image data to the cloud. In addition, a power port may be provided to receive power from an external power source.

In some embodiments, the magnifying lamp 10 includes an infrared (IR) receiver 72 to detect IR signals, such an encoded IR beams, emitted from an external device, such as from the remote control 60. The IR receiver 72 can be disposed at various locations on the lamp head 12. In the embodiment shown, the IR receiver 72 is disposed on the bottom, rear side 42 of the housing 28, at an outer periphery of the magnifying lens 14. The camera 18 preferably depends below the magnifying lens 14 for a clear field of view. Other types of data communication between the magnifying lamp 10 and the remote control 60 are possible, including radio-frequency (RF) or Bluetooth® communication.

Controls for the camera 18 may be provided on the magnifying lamp 10, such as on the lamp head 12, or remote from the magnifying lamp 10 such as on the remote control 60 and/or on a user interface displayed by the display device 56. The camera controls can be provided as multiple buttons on a user interface. The buttons can be provided on the lamp head 12 (see FIG. 3) and/or or on the remote control 60 (see FIG. 7). A button in accordance with the present invention comprises an input component capable of receiving an input from the user, such as, but not limited to, tactile switches, capacitive sensing buttons, push buttons, rotary buttons, touchscreen inputs, a tap detector (e.g., an accelerometer), and the like.

FIG. 6 shows an example of a user interface 76 for the camera 18. This user interface 76 can be provided on the remote control 60 and/or on the display device 56. In one embodiment, the user interface 76 includes a multiple buttons, including a power button 78 to turn the camera 18 on and off, a snapshot button 80 to take a still image, a snapshot playback button 82 to start/stop playback of a still image, a record button 84 to start/stop recording a video, a record playback button 86 to start/stop playback of a recorded video, an up button 88 to pan the image frame up, a down button 90 to pan the image frame down, a left button 92 to pan the image frame left, a right button 94 to pan the image frame right, an ok button 96 to confirm a selection, a zoom in button 98 to increase the display scale, a zoom out button 100 to reduce the display scale, a freeze button 102 to pause the image, and a cross button 104 to apply/remove cross hairs over the image. The user interface 76 can optionally include a mode button 120 to place the magnifying lamp 10 in a power saving mode. The user interface can optionally include a menu button 122 to bring up an on-screen menu on the display device 56 (FIG. 5) or other external device connected to the magnifying lamp 10, where the on-screen menu allows the user to select various functions, some non-limiting examples of which include language, on screen grid lines, camera color settings, and other camera settings.

FIG. 7 is a top view of a remote control 60 for a magnifying lamp 10 according to yet another aspect of the invention. The remote control 60 can be a handheld, wireless device used to operate the camera 18 of the magnifying lamp 10 using light signals in the IR range. The remote control 60 can include an IR transmitter, such as an LED light, which sends encoded IR beams to the IR receiver 72 of the magnifying lamp 10. In the embodiment shown, the remote control 60 has a plurality of camera control buttons 78-104 arranged as shown in Table 1.

Referring back to FIG. 3, a user interface 106 for operating the camera 18 can be provided locally on the magnifying lamp 10. The user interface 106 can include a plurality of buttons disposed on the lamp head 12 in various locations, and preferably may be on a top side 52 of the housing 28 so that a user can view the user interface 106 during normal operation of the magnifying lamp 10. The local user interface 106 can comprise one or more of the same buttons as the remote control 60 to provide redundancy to the remote control. In the embodiment shown, the user interface 106 includes a power button 108, a combined snapshot/snapshot playback button 110, a combined record/record playback button 112, a zoom in button 114, a freeze button 116, and a cross button 118. In other embodiments of the magnifying lamp 10, the local user interface 106 is not provided, and the camera 18 is only controlled remotely.

FIGS. 8-11 show a magnifying lamp 10' according to another aspect of the invention. The magnifying lamp 10' is substantially similar to the magnifying lamp 10 described above with respect to FIGS. 1-7, save for only having wireless remote control for the camera 18'. In other words, the magnifying lamp 10' does not have a local user interface or a port to tether a remote control to the magnifying lamp 10'. Camera control is performed via a wireless remote control, one non-limiting embodiment of which is shown in FIG. 7. In FIG. 8-11, like elements are referred to with the same reference numerals bearing a prime (') symbol.

Figure 11:
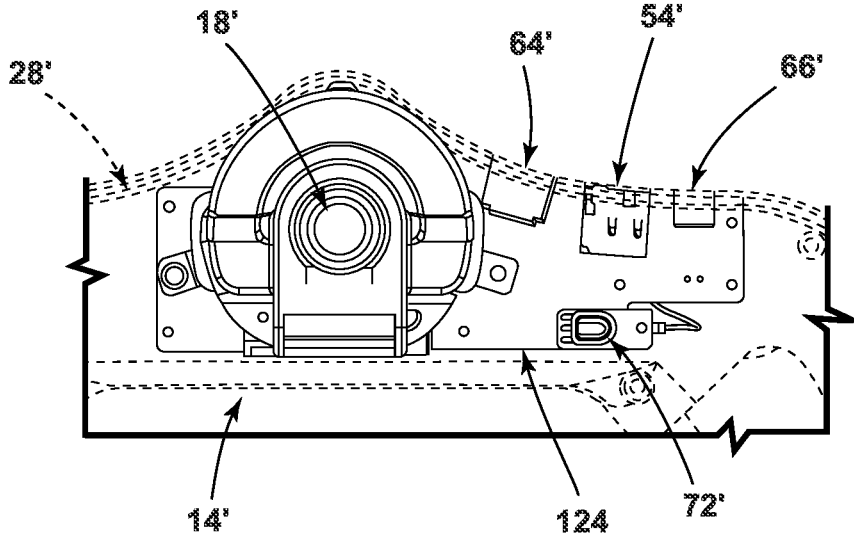
FIG. 11 is a view similar to FIG. 10 showing internal components of the magnifying lamp.

Referring to FIG. 11, the magnifying lamp 10' can have a printed circuit board assembly (PCBA) 124 that mounts the display port 64', media port 54', data port 66', IR receiver 72', and/or other components. Thus, the components may be assembled on the PCBA 124, and the PCBA 124 is then installed into the lamp head 12' to establish electrical connections between the camera 18' and the ports 54', 64', 66'. The display port 64', media port 54', data port 66', IR receiver 72' can all be disposed to one side of the camera 18' for a compact package that maximizes space within the lamp head 12' for the magnifying lens 14'.

The terms "comprising" or "comprise" are used herein in their broadest sense to mean and encompass the notions of "including," "include," "consist(ing) essentially of," and "consist(ing) of." The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "-" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A magnifying lamp comprising:
a lamp head comprising a housing supporting a magnifying lens;
an arm coupled with the lamp head by a joint, the joint permitting the lamp head to be positioned at a plurality of angles;
a light source on the lamp head;
a camera integrated with the lamp head and depending from the housing below the magnifying lens, the camera being disposed on a bottom side of the housing adjacent an outer periphery of the magnifying lens, wherein the camera is coupled with the housing by a moveable joint that permits rotation of the camera about at least one axis independently of movement of the lamp head to adjust the angle of the camera independently of the lamp head;
a media port on the lamp head and configured to receive a removable media to store image data from the camera;
an external display port on the lamp head and configured to connect the camera to an external display device;
a data port on the lamp head and configured to transfer data between the camera and an external device;
a remote control for the camera, the remote control comprising a user interface for controlling operation of the camera;
an infrared receiver on the lamp head and configured to detect infrared signals emitted from the remote control; and
a printed circuit board assembly disposed within the lamp head, wherein the printed circuit board assembly mounts the media port, the external display port, the data port, and the infrared receiver, and wherein the printed circuit board assembly electrically couples the camera to the media port, the external display port, the data port, and the infrared receiver;
wherein the camera defines a first side and a second side; and
wherein the media port, the external display port, the data port, and the infrared receiver are disposed on the first side of the camera.

2. The magnifying lamp of claim 1, wherein the joint is a swivel joint and the lamp head comprises an adjustable tension knob to adjust a force needed to swivel the lamp head.

3. The magnifying lamp of claim 2, wherein the housing comprises a handle that can be gripped to adjust a position of the lamp head.

4. The magnifying lamp of claim 1, wherein the light source comprises a plurality of light-emitting diodes.

5. The magnifying lamp of claim 4, wherein the light-emitting diodes are disposed on the bottom side of the housing, at the outer periphery of the magnifying lens, with a first plurality of light-emitting diodes arranged on a first side of the magnifying lens and a second plurality of light-emitting diodes arranged on a second side of the magnifying lens.

6. The magnifying lamp of claim 5, wherein the camera is disposed between the first and second plurality of light-emitting diodes.

7. The magnifying lamp of claim 1, wherein the lamp head has a power button to turn the light source on and off.

8. The magnifying lamp of claim 7, wherein the user interface comprises a power button to turn the camera on and off, whereby the camera can be controlled independently of the light source.

9. The magnifying lamp of claim 1, wherein the camera is a digital camera configured to capture a still image or a video.

10. The magnifying lamp of claim 1, wherein the camera comprises a handle that can be gripped to adjust the angle of the camera independently of the lamp head.

11. The magnifying lamp of claim 1, comprising an indicator light to show a status of the camera, the indicator light disposed on a top side of the housing.

12. The magnifying lamp of claim 1, comprising a remote control port to connect the remote control to the camera.

13. The magnifying lamp of claim 1, wherein the user interface comprises multiple buttons chosen from:
a power button to turn the camera on and off;
a snapshot button to take a still image;
a snapshot playback button to start and stop playback of a still image;
a record button to start and stop recording a video;
a record playback button to start and stop playback of a recorded video;
an up button to pan an image frame up;
a down button to pan an image frame down;
a left button to pan an image frame left;
a right button to pan an image frame right;
an ok button to confirm a selection;
a zoom in button to increase a display scale;
a zoom out button to reduce a display scale;
a freeze button to pause an image; and
a cross button to apply and remove cross hairs over an image.

14. The magnifying lamp of claim 1, wherein:
the external display port, the media port, and the data port are disposed on a rear peripheral side of the housing on the first side of the camera.

* * * * *